United States Patent [19]

Fujito

[11] Patent Number: 5,019,915
[45] Date of Patent: May 28, 1991

[54] APPARATUS FOR PRINTING OR CLEARING A DISPLAYED STORED VIDEO SIGNAL

[75] Inventor: Shogo Fujito, Kanagawa, Japan

[73] Assignee: Sony Corporation, Tokyo, Japan

[21] Appl. No.: 353,343

[22] Filed: May 17, 1989

[30] Foreign Application Priority Data

May 25, 1988 [JP] Japan .................... 63-127890

[51] Int. Cl.$^5$ .............................................. H04N 1/46
[52] U.S. Cl. ........................................ 358/335; 358/244
[58] Field of Search ............. 358/335, 35.1, 906, 358/909, 98, 336, 333, 76, 244, 244.2, 78; 355/20

[56] References Cited

U.S. PATENT DOCUMENTS

| 4,459,616 | 7/1984 | Lemke ................... 358/244 |
| 4,656,524 | 4/1987 | Norris et al. ............ 358/76 |
| 4,689,696 | 8/1987 | Plummer ................ 358/333 |
| 4,703,366 | 10/1987 | Kobow et al. .......... 358/335 |
| 4,727,418 | 2/1988 | Kato et al. ............. 358/98 |
| 4,827,347 | 5/1989 | Bell ...................... 358/906 |
| 4,829,386 | 5/1989 | Takei et al. ............ 358/336 |
| 4,829,386 | 5/1989 | Takei et al. ............ 358/336 |
| 4,837,628 | 6/1989 | Sasaki .................. 358/906 |

*Primary Examiner*—Roy N. Envall, Jr.
*Assistant Examiner*—Huy Nguyen
*Attorney, Agent, or Firm*—Philip M. Shaw, Jr.

[57] ABSTRACT

A video signal printer which includes a microcomputer controller programmed to prevent an input video image from being printed or cleared instead of a still image which is stored in a memory.

9 Claims, 3 Drawing Sheets

APPARATUS FOR PRINTING OR CLEARING A DISPLAYED STORED VIDEO SIGNAL

BACKGROUND OF THE INVENTION

1. Field of the Invention

The present invention relates to a printing apparatus, and more particularly, to a video printing apparatus.

2. Description of the Prior Art

In a prior art printing apparatus, for example, a color video printer, a button for starting a printing operation and a clear button for clearing a signal representing an image to be printed are arranged on a printer body. Also, a monitor display can be connected to the color video printer so as to monitor an input image signal and a print image signal stored in a memory of the color video printer. Therefore, printing is started by depressing the print button which causes a print image signal stored in the memory to be printed out. Also, depressing the clear button causes the print image signal stored in the memory to be erased.

In a conventionally constructed color video printer, a depression of the print button at the time an input image signal is being displayed on the monitor display causes the printing operation to be started. In this event, if the input image signal represents a moving image, the image displayed on the monitor display will not be mistaken for an image represented by a signal which is stored in the memory. However, in the case where an input image signal represents a still image, if the operator erroneously presses the print button, under the assumption that this image has already been stored in the memory, the printed-out image will be that previously stored in the memory which is different from the one which is supposed to be printed out, thereby causing a problem of performing a useless printing.

Further, if the operator presses the clear key so as to erase an image signal stored in the memory, on the assumption that the image displayed on the monitor display is the image to be erased, he may erase image information stored in the memory which is not desired to be erased.

OBJECTS AND SUMMARY OF THE INVENTION

In view of the above-mentioned problem, it is a first object of the present invention to provide a printing apparatus which is capable of solely permitting an image of a signal stored in the memory to be printed out even if the print button is erroneously pressed and thereby eliminating a useless printing.

It is a second object of the present invention to provide a printing apparatus which is capable of exclusively clearing an image signal to be cleared which is already stored in the memory when the clear button is pressed.

According to a first aspect of the present invention, there is provided a printing apparatus for a video signal comprising input means for receiving a video signal from a peripheral system, memory means for storing the video signal as a still image, output means for displaying the still image from the memory means or the video signal from the input means, switching means for selecting the still image or the video signal and transmitting the selected one to the output means, starting means for supplying a starting signal, printing means for printing out the signal stored in the memory means, and control means for transmitting signals to the memory means, the input means, the switching means, the output means and the printing means, wherein when the control means is supplied with the starting signal, the switching means is controlled by the control means so as to supply the output means with the still image stored in the memory means.

According to a second aspect of the present invention, when the control means is supplied with a clearing signal generated by a clearing key, the switching means is controlled by the control means so as to supply the output means with the still image stored in the memory means.

These and other objects, features and advantages of the present invention will become apparent from the following detailed description of the preferred embodiment taken in conjunction with the accompanying drawings, throughout which like reference numerals designate like elements and parts.

DETAILED DESCRIPTION OF THE PREFERRED EMBODIMENT

Figure 1:
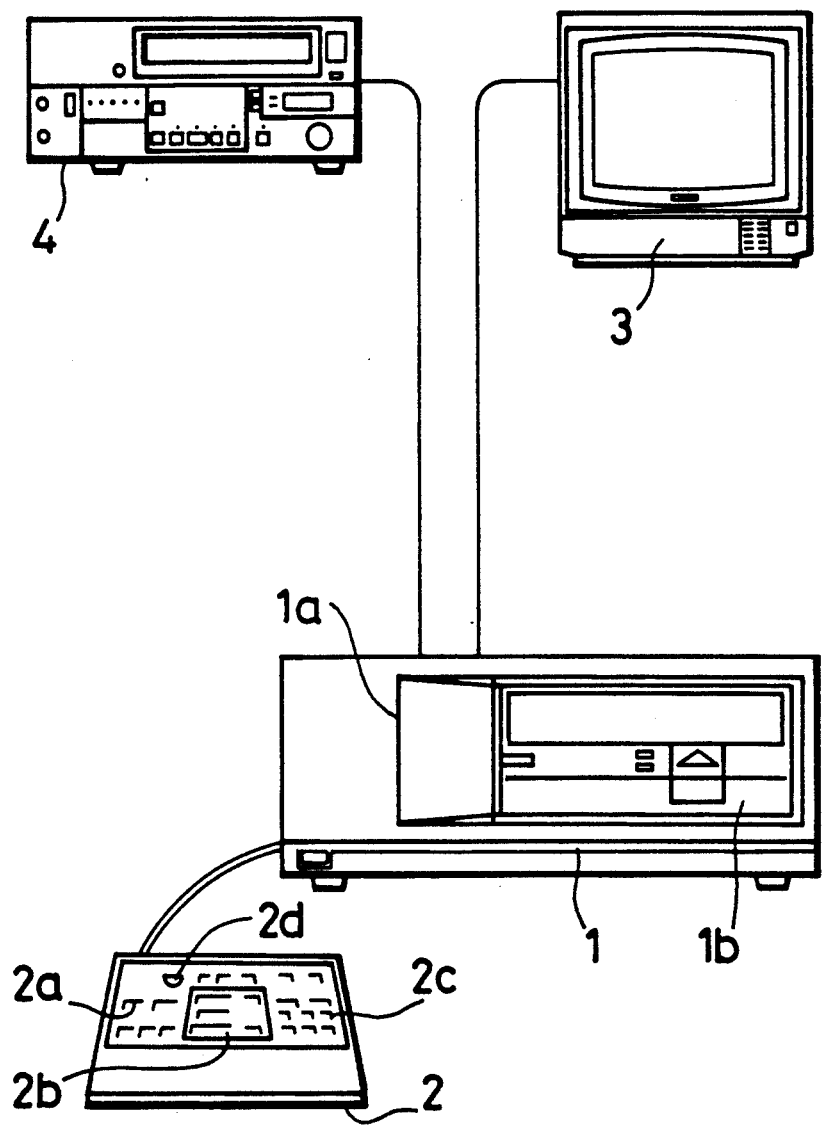
FIG. 1 is a block diagram showing an arrangement of an embodiment of a printing apparatus according to the present invention.
Figure 2:
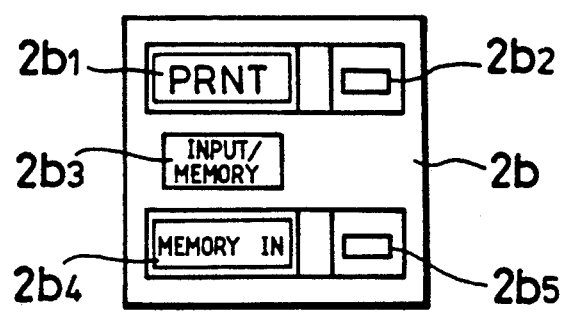
FIG. 2 is a diagram showing a part of the keyboard apparatus appearing in FIG. 1 in an enlarged scale.

The construction of the printing apparatus of the present invention, for example, a color video printer is shown in FIGS. 1 and 2.

In FIG. 1, reference numeral 1 designates a color video printer, and its printing operation is effected by a keyboard apparatus 2. The keyboard apparatus 2 roughly consists of an operation section 2a relative to the memory, an operation section 2b relative to the printing and an adjusting section 2c for the picture quality and hue of a printed image.

As shown in FIG. 2, the operation section 2b relative to the printing comprises a print button $2b_1$ for initiating printing, a print stop button $2b_2$ for stopping printing midway, an input/memory change-over button $2b_3$ for changing over between a memorized image to be printed and an image being inputted, a memory-in button $2b_4$ for storing an image to be printed in the memory, a clear button $2b_5$ for erasing an image signal stored in the memory and so on.

Turning back to FIG. 1, there is provided a monitor display or television receiver 3 which is coupled to the color video printer 1, and which allows an image being reproduced and an image to be printed to be viewed and a variety of messages from the color video printer 1 to be displayed. Reference numeral 4 designates a signal source of an image to be printed, such as a video apparatus or the like, which is coupled to the color video printer 1.

An image printing operation by the color video printer 1 constructed as mentioned above is effected in the following manner. First, a cover 1a of the color video printer 1 is opened, an ink ribbon cassette (not shown) is fitted, a print paper (not shown) is set on a paper feeding tray 1b, and the power supply to the monitor display 3 and the color video printer 1 is turned on. Then, an input selection button 2d on the keyboard apparatus 2 is pressed. If an input signal is selected by the selection button 2d, the inputted image signal is displayed on the monitor display 3. In this example, after a while, the inputted signal displayed on the monitor television receiver 3 is erased. Next, when an image desired to be printed appears on the monitor display 3, the memory-in button $2b_4$ is pressed to store the image in the memory. Next, if the print button $2b_1$ on the keyboard apparatus 2 is pressed, the image is printed out by the color video printer 1 and delivered out therefrom.

Figure 3:
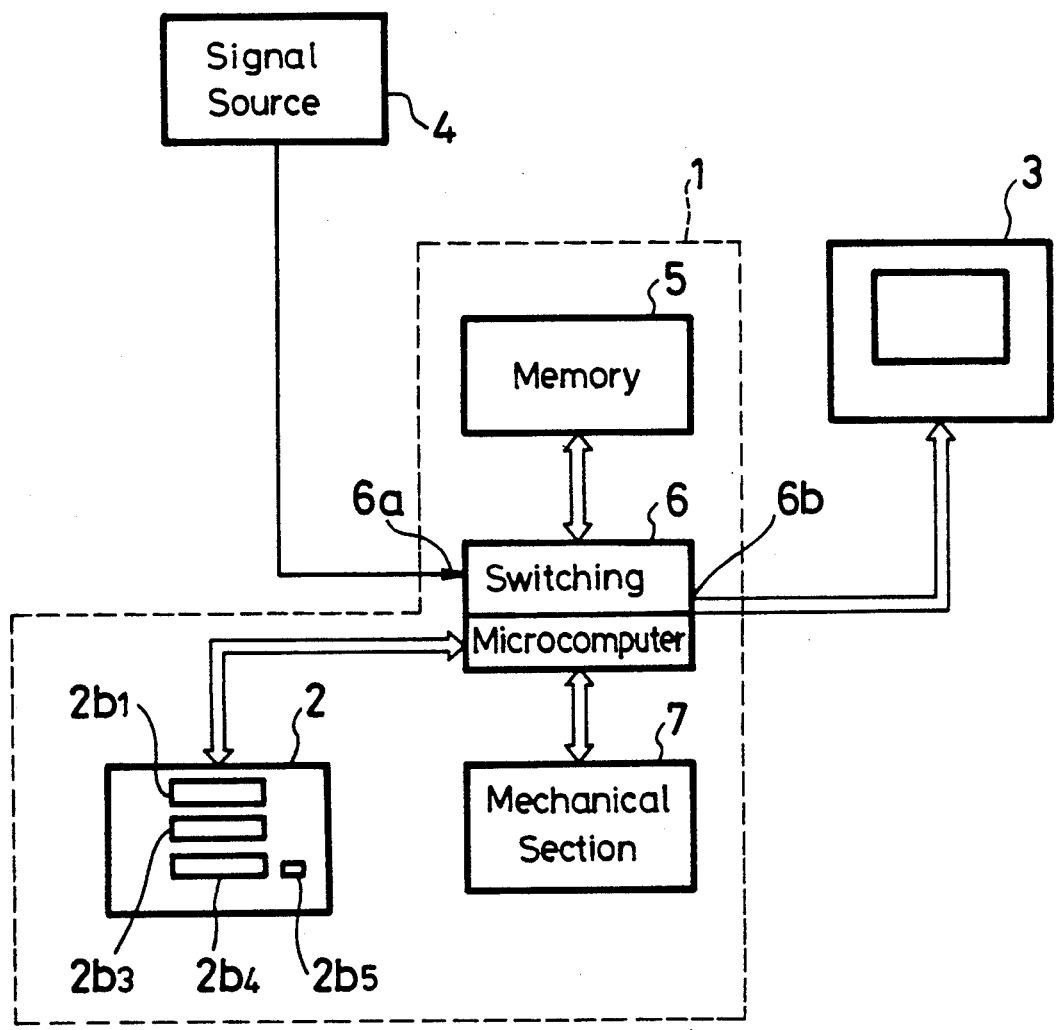
FIG. 3 is a systematic block diagram of an arrangement of the printing apparatus according to the present invention.

Further, if the clear button $2b_5$ is pressed, the print image information stored in the memory is cleared. FIG. 3 is a systematic block diagram of the present embodiment. The printing apparatus comprising, for example, the color video printer 1 is constituted of the keyboard apparatus 2, a display monitor 3, a memory 5 such as RAM or the like, and a mechanical section 7 which serves as printing means of the color video printer 1, all of which are connected to a microcomputer controller 6. The image signal from the video apparatus 4 is fed through an inputting means 6a of the microcomputer 6 such as an input interface or the like to the microcomputer 6. An output signal for displaying is supplied through an output means 6b of the microcomputer 6 such as an output interface or the like to the monitor display 3, whereby an inputted image signal or an image signal stored in the memory 5 is displayed on a CRT (cathode ray tube) of the monitor display 3.

The microcomputer 6 is arranged to control the memory 5 and the mechanical section 7 of the color video printer 1 through a data bus or a control bus. In effect, the microcomputer, in addition to its control functions, acts as a switcher for supplying either the contents of the memory 5 or the signal source 4 to the display monitor 3.

Next, explanation will be given of a printing procedure carried out by the color video printer 1 of the present embodiment with reference to a flow chart of FIG. 4.

Figure 4:
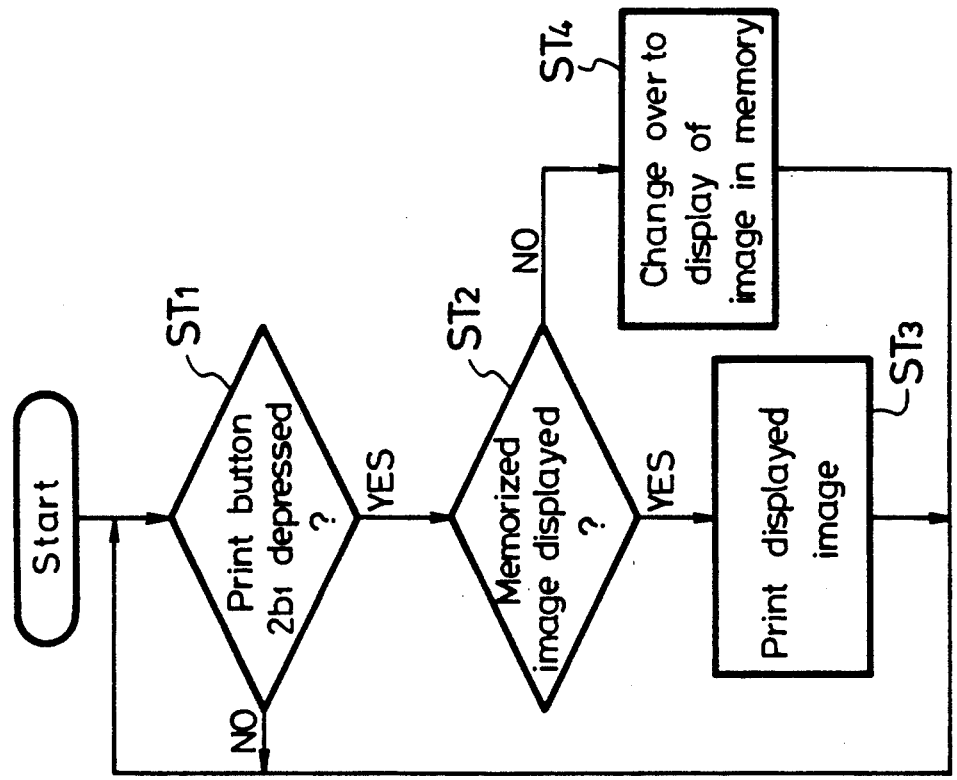
FIG. 4 is a flow chart showing the procedure of the printing operations carried out by the printing apparatus according to the present invention.

In FIG. 4, the microcomputer 6 determines whether the print button $2b_1$ is pressed or not, as shown in the first step $ST_1$. For the condition of NO where it is not pressed, the determination of the step $ST_1$ is always repeated. In the condition of YES where the print button $2b_1$ is pressed, the microcomputer 6 determines, as shown in the second step $ST_2$, whether a memorized image is displayed on the monitor display 3. If the answer is yes, the microcomputer 6 proceeds to cause the mechanical section 7 to print the displayed image at step $ST_3$ and returns to step $ST_1$. If the answer is NO, the microcomputer 6 effects, as shown in the fourth step $ST_4$, a change-over operation which erases an inputted image signal displayed on the monitor display 3, displays an image signal stored in the memory on the CRT of the monitor display 3, and returns to step $ST_1$.

Therefore, the operator can decide whether to print or not after watching the image on the monitor display 3. If the print button $2b_1$ is pressed, the operation returns to the first step $ST_1$ for determining whether the print button $2b_1$ is pressed or not. Thus, through the procedure of the first step $ST_1$, the second step $ST_2$ and the third step $ST_3$, the mechanical section 7 of the printer is driven to start a printing.

The described color video printer can prevent the operator from mistaking an input image signal for an image signal stored in the memory and erroneously printing out the input image signal. Also, in the condition where an input image signal is displayed on the monitor display 3, the color video printer of the present embodiment does not allow a printing of the input image signal even if the print button $2b_1$ is erroneously pressed, thereby avoiding useless consumption of print paper caused by an erroneous operation.

Next, the procedure when the clear button $2b_5$ is pressed will be explained with reference to a flow chart of FIG. 5.

Figure 5:
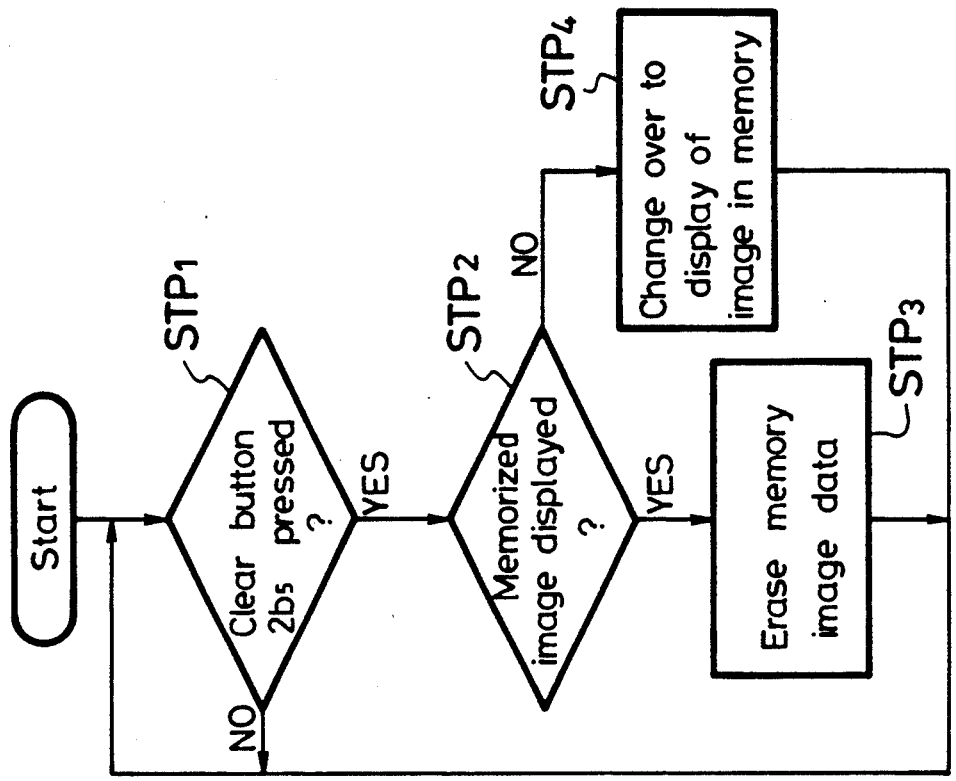
FIG. 5 is a flow chart showing the procedure of the erasing operation carried out by the printing apparatus according to the present invention.

In FIG. 5, the microcomputer 6 determines whether the clear button $2b_5$ is pressed or not, as shown in the first step $STP_1$. In the condition of NO where it is not pressed, the determination of the step $STP_1$ is always repeated. In the condition of YES where the clear button $2b_5$ is pressed, the microcomputer 6 determines, as shown in the second step $STP_2$, whether or not a memorized image is displayed on the monitor display 3. When the answer is YES, the microcomputer 6 erases the image data from the memory 5 and returns to step $STP_1$. If the answer is NO, the microcomputer 6 effects, as shown in the fourth step $STP_4$, a change-over operation which erases an inputted image signal displayed on the monitor display 3 and displays an image signal stored in the memory 5 on the CRT of the monitor display 3. The microcomputer then returns to step $STP_1$.

Therefore, the operator can decide whether to erase the image on the monitor display 3 or not, while seeing the image on the monitor display 3. If the clear button $2b_5$ is pressed, the operation returns to the first step $STP_1$ for determining whether the print button $2b1$ is pressed or not. Then, through the procedure of the first step $STP_1$, the second step $STP_2$ and the third step $STP_3$, the operation of erasing the memory image data stored in the memory 5 is executed.

The color video printer as described above can prevent the operator from mistaking an input image signal for an image signal stored in the memory and accordingly from mistakenly erasing an important memorized image signal.

According to the color video printer of the present embodiment, since the operator can clearly recognize an image or character information, figures and so on to be printed or erased by seeing the same displayed on the monitor display, it is possible to prevent such bad effects as useless paper consumption caused by erroneous printing and erasure of a memorized important image signal.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

What is claimed is:

1. An apparatus for displaying and printing a still image video signal comprising:
   input means for receiving a video signal from a peripheral system;

memory means connected to the input means for storing the input video signal as a still image video signal;

switching means connected to the input means for selecting between the stored still image signal and the video signal and outputting the signal selected;

display means connected to the switching means for displaying the signal selected;

starting means for supplying a starting signal;

printing means connected to the switching means for printing out the signal selected; and control means connected to the starting means to receive the starting signal and to the memory means, the input means, the switching means, the display means and the printing means for transmitting control signals thereto, wherein when the control means receives the starting signal, the switching means is controlled by the control means so as to output to the display means the still image signal stored in the memory means.

2. A printing apparatus for a video signal according to claim 1, wherein when the switching means is outputting the video signal to the display means and the control means is supplied with the starting signal, the control means controls the printing means so that it is prevented from printing.

3. A printing apparatus according to claim 2, wherein when the stored still image signal is being output by the switching means to the display means and the print command signal is supplied to the control means, the control means causes the printing means to print the stored still image signal.

4. A printing apparatus for a video signal according to claim 3, further comprising clearing means for supplying a clearing signal to the control means and wherein when the control means is supplied with the clearing signal the control means causes the memory means to erase its contents and if the clearing signal is supplied while the switching means is outputting the video signal to the display means, the control means inhibits the memory means from being supplied with the clearing signal and the switching means is controlled to select the stored still image signal.

5. A printing apparatus according to claim 1, wherein the starting means comprises a print key for initiating the generation of the print command signal.

6. A printing apparatus for a video signal comprising:

input means for receiving a video signal from a peripheral system;

memory means connected to the input means for storing the video signal as a still image signal;

clearing means for generating a clearing signal;

switching means connected to the input means for selecting between the stored still image signal and the video signal and outputting the selected signal;

display means connected to the switching means for displaying the selected signal;

printing means connected to the switching means for printing out the selected signal; and will control means connected to the clearing signal means to receive the clearing signal and to the memory means, the input means, the display means and the printing means for transmitting control signals thereto, wherein when the control means is supplied with the clearing signal, the switching means is controlled by the control means so as to supply the display means with the stored still image signal and thereafter, if the clearing signal continues to be supplied to the control means, to cause the memory means to erase its contents.

7. A printing apparatus for a video signal according to claim 6, wherein the clearing means comprises a clear key for initiating the generation of the clearing signal.

8. A printing apparatus for a video signal according to claim 6, wherein the control means is comprised of a central processing unit.

9. A printing apparatus for a video signal according to claim 8, wherein the switching means is included in the central processing unit.

* * * * *